Jan. 18, 1938.　　C. C. BARBER ET AL　　2,105,900

SHAFT BEARING

Filed Nov. 20, 1935

INVENTORS C. C. BARBER
C. W. McWILLIAMS
BY P. C. Smith
ATTORNEY

__Patented Jan. 18, 1938__                                          __2,105,900__

UNITED STATES PATENT OFFICE 2,105,900

SHAFT BEARING

Charles C. Barber, Rockville Centre, N. Y., and Charles W. McWilliams, Kearny, N. J., assignors to Bell Telephone Laboratories, Incorporated, New York, N. Y., a corporation of New York Application November 20, 1935, Serial No. 50,644

2 Claims. (Cl. 308—72)

This invention relates to a bearing cap for holding a bushing or the like rigidly in position around a shaft bearing.

One of the chief objects of our invention is to provide a bearing cap which will hold a bushing in a self-aligning position within a bearing bracket assembly without, at the same time, binding the drive shaft that passes through the bearing. To this end, the cap, which forms the subject of the invention, is designed to be flexible instead of rigid, this flexibility being achieved by removing metal from the central portion of one of the two parts of the cap so that the clamping surfaces are held together by two narrow portions or pads of metal. The spherical surfaces of the cap and the bearing bracket are also relieved so that the bushing will seat against two bearing pads on the bracket and one each on the narrow portions of the cap. When a bushing is clamped in the bearing cap assembly, said cap is sufficiently flexible to permit the bearing pads to move in opposite directions longitudinally to the axis of the shaft. This prevents the clamping pressure on the bushing from being great enough to distort said bushing and to cause the shaft to bind within the bushing.

A clearer conception of the scope and purpose of the invention may be obtained from a consideration of the following description and appended claims together with the accompanying drawing, in which:

Figure 1:
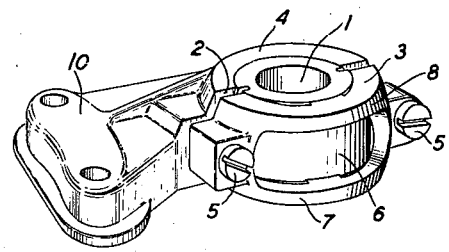
Fig. 1 shows a perspective view of the shaft bearing bracket with the two parts of the bearing cap assembled to inclose the bushing through which the shaft (not shown) passes.
Figure 2:
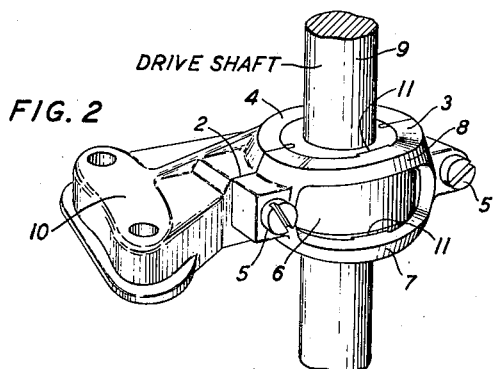
Fig. 2 is the same view as Fig. 1 but illustrating, in addition, that part of the drive shaft which passes through the bushing.
Figure 3:
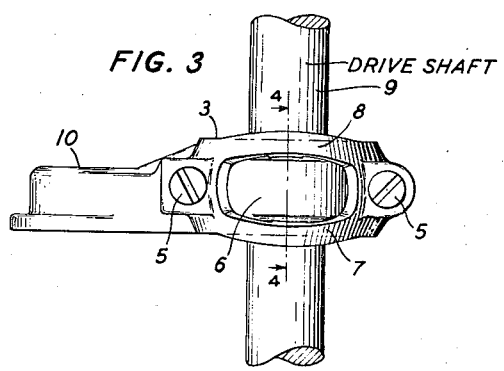
Figure 4:
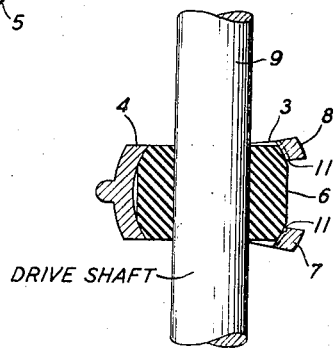

Fig. 3 shows the front view of the shaft bracket and assembled bearing cap parts, the front cap showing an exaggerated displacement of two bearing pads when the two parts of the cap are tightened to inclose the bushing; while Fig. 4 is a cross-sectional view along the section line 4—4 in Fig. 3, illustrating the vertical displacement of the bearing pads when the cap is tightened against the bushing.

Referring, now, to the details of that specific embodiment of our invention chosen for purposes of illustration, 9 is a shaft extending transversely through a main frame and required to be capable of limited tilting movement or an angular displacement relative thereto for the purpose of shaft alignment, and 6 is a substantially spherical bearing element, or bushing, within which the shaft 9 may have a rotary or reciprocatory movement or both a rotary and reciprocatory movement.

In order to permit a tilting of the shaft 9 and the bearing element 6 therewith, a bearing bracket is provided comprising two complementary cap members 4 and 3, respectively, which when assembled to inclose the bushing 6, constitute a universal or ball and socket connection within which the shaft 9 can be self-aligning. The cap member 4 is integral with the bracket 10 for attachment to a supporting frame and the cap member 3 is detachable and capable of being secured to the cap member 4 by means of screws 5 fitting into appropriate complementary screw housings located at the extremities of the cap member 3 and registering with tapped holes on the inner sides of the cap member 4.

The inner surface of cap member 4 may be so configurated as to provide, when joined with front cap member 3 and having the bearing element 6 enclosed within, a lateral cushion support for said bearing element along the upper and lower circular ridges thereof, as illustrated in Fig. 4.

The front cap member 3 has an opening which extends between the two screw housings and is sufficiently wide to form two bands 7 and 8 having interior bearing surfaces or pads 11 which rest upon the upper and lower circular ridges of the bearing element 6 when said element is enclosed between the two cap members.

The above described construction of the cap members, and particularly the front member 3, avoids the possibility of binding the shaft 9 or cracking the bearing element 6 when too much pressure is applied to said bearing element by an over tightening of the screws 5. When the screws are driven beyond the point where the pressure of the cap member 3 would exert a harmful thrust upon the bearing element, this thrust permits the bearing bands 7 and 8 to move in opposite directions longitudinally to the axis of the shaft, as illustrated in Figs. 3 and 4, and prevents the clamping pressure from becoming great enough to distort the bearing element 6 or bind the shaft 9.

What is claimed is:

1. A support for a shaft bearing and the like comprising a rear member and a front member to support a bearing, said front member having an upper band and a lower band, and interior pads suitably disposed along each of said bands to support the bearing and flexible laterally along its surface when more than a predetermined pressure is applied to said front member.

2. A support for a shaft bearing comprising two complementary members, a bearing bushing disposed within said members and capable of universal movement therein, and means for clamping said members together around said bushing, one of said members having two parallelly disposed bands for engagement with said bushing and flexible laterally along the surface thereof when more than a predetermined pressure is applied to said clamping means.

CHARLES C. BARBER.
CHARLES W. McWILLIAMS.